(12) United States Patent
Brindle

(10) Patent No.: US 7,614,465 B2
(45) Date of Patent: Nov. 10, 2009

(54) SUB-FRAMES FOR A WORKING VEHICLE

(75) Inventor: Richard James Brindle, Burton on Trent (GB)

(73) Assignee: JCB Compact Products Limited, Rocester, Uttoxeter, Staffordshire (GB)

( * ) Notice: Subject to any disclaimer, the term of this patent is extended or adjusted under 35 U.S.C. 154(b) by 236 days.

(21) Appl. No.: 11/623,773

(22) Filed: Jan. 17, 2007

(65) Prior Publication Data

US 2007/0169967 A1    Jul. 26, 2007

(30) Foreign Application Priority Data

Jan. 20, 2006    (GB)    ................. 0601141.5

(51) Int. Cl.
  *B62D 55/00*    (2006.01)
(52) U.S. Cl. ................. 180/9.1; 280/124.109; 280/781
(58) Field of Classification Search ................. 180/9.1, 180/9.5, 9.48, 311, 89.12; 280/124.109, 280/781; 305/120, 127, 130
  See application file for complete search history.

(56) References Cited

U.S. PATENT DOCUMENTS

| | | | | |
|---|---|---|---|---|
| 1,379,710 | A * | 5/1921 | Matteson ................. | 180/54.1 |
| 1,439,236 | A * | 12/1922 | Harris ................. | 305/154 |
| 1,773,252 | A * | 8/1930 | Bager et al. ................. | 180/6.7 |
| 1,836,446 | A * | 12/1931 | Christie ................. | 180/9.1 |
| 1,875,052 | A * | 8/1932 | Ljungkull ................. | 414/800 |
| 2,144,760 | A * | 1/1939 | Harnischfeger ................. | 212/253 |
| 2,813,760 | A * | 11/1957 | Spanjer ................. | 305/139 |
| 3,007,740 | A * | 11/1961 | Ronning ................. | 301/6.3 |
| 3,398,806 | A * | 8/1968 | Hendricks ................. | 180/9.1 |
| 3,477,769 | A * | 11/1969 | Thompson ................. | 305/201 |
| 3,529,687 | A * | 9/1970 | Pensa ................. | 180/6.48 |
| 3,824,578 | A * | 7/1974 | Harders ................. | 340/685 |
| 3,863,726 | A | 2/1975 | O'Brien et al. | |
| 3,938,605 | A * | 2/1976 | Koch ................. | 180/9.5 |
| 4,231,699 | A | 11/1980 | Thompson | |
| 4,383,794 | A | 5/1983 | Sankey | |
| 4,836,318 | A | 6/1989 | Tonsor et al. | |
| 7,104,306 | B2 * | 9/2006 | Huggins et al. ................. | 164/47 |
| 7,216,926 | B2 * | 5/2007 | Hampel ................. | 296/190.08 |
| 7,229,140 | B2 * | 6/2007 | Page et al. ................. | 305/151 |
| 7,293,375 | B2 * | 11/2007 | Fukushima et al. ................. | 37/397 |
| 2006/0080930 | A1 * | 4/2006 | Brindle ................. | 52/655.1 |

(Continued)

FOREIGN PATENT DOCUMENTS

EP    1550600 A1    7/2005

(Continued)

*Primary Examiner*—Tony H. Winner
(74) *Attorney, Agent, or Firm*—MacMillan, Sobanski & Todd, LLC

(57) ABSTRACT

A working machine having a main frame structure which includes a pair of endless tracks. Each track is entrained about track supporting devices mounted by a track sub-frame. The sub-frame includes inner and outer members interconnected by cross members. The inner and outer members are arranged side by side. At least one upper track support device is mounted between the inner and outer members at or adjacent upper edges thereof. At least one lower track supporting device is mounted to extend between the inner and outer members at or adjacent lower edges thereof. The inner and outer members and cross members of at least one of the track sub-frames is provided by a monolithic casting.

11 Claims, 2 Drawing Sheets

U.S. PATENT DOCUMENTS

2007/0029878 A1* 2/2007 Gaudreault et al. ......... 305/130
2007/0148004 A1* 6/2007 Wernicke et al. ........ 416/244 R
2008/0024006 A1* 1/2008 Brindle ....................... 305/199

FOREIGN PATENT DOCUMENTS

| EP | 1564113 A1 | 8/2005 |
|---|---|---|
| EP | 1811090 A2 * | 7/2007 |
| GB | 760922 | 11/1956 |
| JP | 2003056005 | 2/2003 |
| WO | WO 03036085 A1 * | 5/2003 |

* cited by examiner

SUB-FRAMES FOR A WORKING VEHICLE

CROSS-REFERENCE TO RELATED APPLICATIONS

Priority is claimed to United Kingdom patent application Serial No. 0601141.5 filed Jan. 20, 2006.

STATEMENT REGARDING FEDERALLY SPONSORED RESEARCH OR DEVELOPEMENT

Not applicable

TECHNICAL FIELD

This invention relates to a working machine of the kind including a frame with a ground engaging lower structure including a pair of endless tracks each entrained about track supporting devices mounted by a track sub-frame.

BACKGROUND OF THE INVENTION

Conventionally track sub-frames are fabricated structures which may mount a track motor which drives a track-driving sprocket. By virtue of the track sub-frames being fabricated they are expensive to produce, requiring the assembly of many different components. Typically such track sub-frames are attached by fasteners for example to the remainder of the ground engaging lower structure.

BRIEF SUMMARY OF THE INVENTION

According to a one embodiment of the invention a working machine is provided having a main frame structure which includes a pair of endless tracks, each track is entrained about track supporting devices mounted by a track sub-frame. The sub-frame includes inner and outer members interconnected by cross members. The inner and outer members are arranged side by side and mount at or adjacent upper edges thereof at least one upper track support device between the members. At or adjacent lower edges thereof, at least one lower track supporting device extends between the members. The inner and outer members and cross members of at least one of the track sub-frames is provided by a monolithic casting.

The cast inner and outer members may have along their respective upper and lower edges, recesses in which mountings for the track supporting devices may be received. Thus the track supporting devices may readily be assembled to the monolithic casting. Desirably, at least some of the track supporting devices each includes a roller carried on a spindle, the mountings mounting the spindles. The upper and lower edges of the inner and outer track sub-frame members may include further recesses as may the remainders of the inner and outer track sub-frame members, primarily to lighten the monolithic casting and to facilitate the removal of mud and other debris which may accumulate in and around the track sub-frames in use. At least one of the inner and outer track sub-frame members may provide a mounting for a track motor which may drive a track drive sprocket located between the inner and outer members, to drive the track.

According to a second embodiment of the invention a method is provided for making a working machine having a main frame structure which includes a pair of endless tracks. Each track is entrained about track supporting devices mounted by a respective track sub-frame. The method includes making at least one of the track sub-frames by providing a monolithic casting including inner and outer track sub-frame members arranged side by side with integral cross members interconnecting the track sub-frame members.

Various objects and advantages of the invention will become apparent from the following detailed description of the invention and the accompanying drawings.

DETAILED DESCRIPTION OF THE INVENTION

Figure 1:
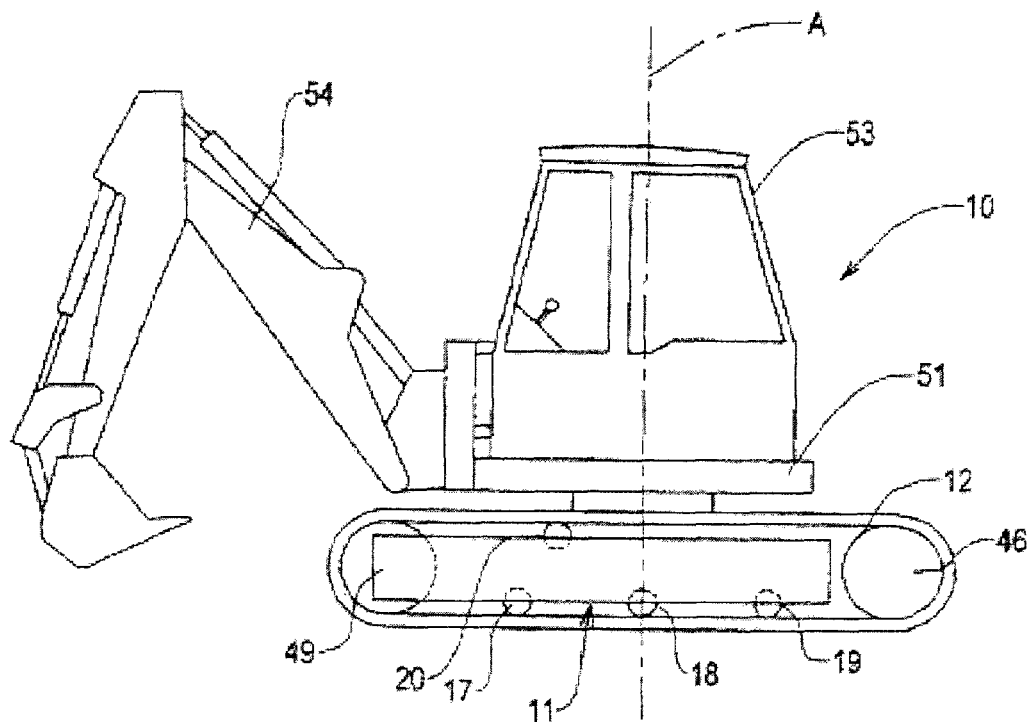
FIG. 1 is an illustrative side view of a working machine which may embody the invention.

Referring to the drawings, a working machine 10 includes a main frame structure 11 which includes a pair of tracks 12, one at each side of the machine 10. Each track 12 is entrained about track support devices which are mounted by respective track sub-frames 15, 16. The track support devices in this example, include three lower rollers 17, 18, 19, the track 12 passing between the lower rollers 17, 18, 19 and the ground, and at least one upper roller 20. The track sub-frames 15, 16 each also include a mounting 47 for a track tensioning device which includes a track tensioning element 49 which is resiliently biased so as to maintain a tension in the track 12.

Each sub-frame 15, 16 has inner 24 and outer 25 members arranged substantially side by side, and cross members 26 between them, the cross members 26 interconnecting and maintaining a spacing between the track sub-frame members 24, 25. The track sub-frame members 24, 25 and the cross members 26 are each provided for each track sub-frame 15, 16 as a monolithic casting. Integrally cast in lower edges 27 of each respective track sub-frame member 24, 25 are a plurality of recesses 30-34. The recesses 30, 31, 32 each mount a spindle of a respective lower track support device roller 17, 18, 19 whilst recesses 33, 34 are each provided to lighten the casting. Integrally cast in upper edges 28, 29 of each of track sub-frame member 24. 25 is a mount 35 for the upper track support device, roller 20, and a further recess 36 to lighten the casting.

The pair of track sub-frames 15, 16 are arranged side by side with a main frame part 40 of the main frame structure 11 between them. The inner track sub-frame members 24 of each of the pair of track sub-frames 15, 16, each are provided with integrally cast inwardly extending formations 42, arranged in pairs. These inwardly projecting formations 42 are provided for attaching the cast track sub-frames 15, 16 to the main frame part 40 as hereinafter described.

Figure 2:
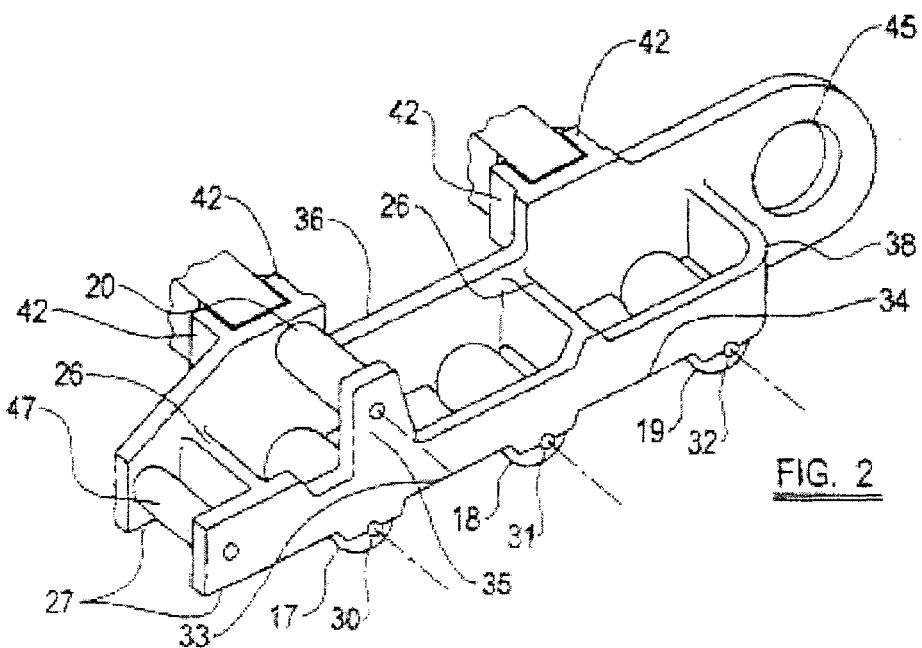
FIG. 2 is an illustrative perspective view of a track sub-frame of the main frame structure of the machine of FIG. 1, but with the track removed for clarity.
Figure 3:
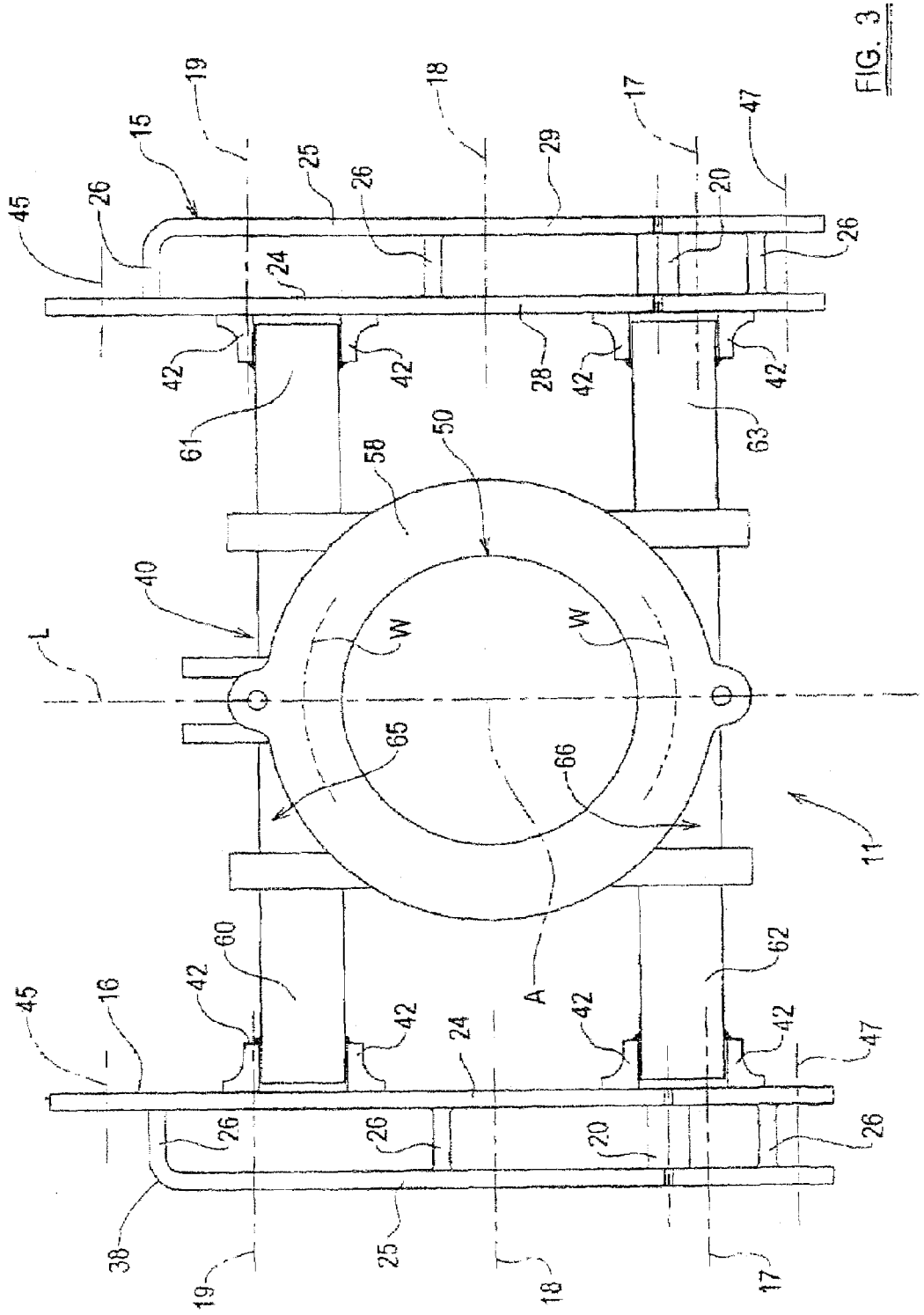
FIG. 3 is an illustrative plan view of the main frame structure of the machine of FIG. 1, again with drive tracks removed.

In FIG. 2, it can be seen that the inner track sub-frame member 24 of each of the pair of track sub-frames 15, 16 extends longitudinally rearwardly of the machine 10, beyond an edge 38 of the outer track sub-frame member 25, and the extended track sub-frame member 24 part, is provided with an opening 45. This opening 45 is for mounting a track motor (not shown) which drives a track drive sprocket 46 (see FIG. 1) to impart drive to the track 12 and hence to the machine 10 over the ground. The track motors conventionally are driven by hydraulic fluid provided by a pump of the machine 10.

At least one of the track sub-frame members 24, 25, both in this example. provide between them the mounting 47 for the track tensioning mechanism which includes the resiliently biased track tensioning element (roller) 49 which is biased in a direction to maintain a desired tension in the track 12.

The main frame part 40 includes a central portion 50 which supports a stewing mechanism. for stewing an upper frame structure 51 relative to the main frame structure 11. The upper frame structure 51 includes a cab 53 for a machine operator, carries a working arm 54, houses an engine and cooling pack (not seen) and mounts the hydraulic pump. The upper frame structure 51 may be slewed by the slewing mechanism relative to the main frame structure 11 about a generally upright axis A. In this example, the central portion 50 of the main frame part 40 supports a slew ring around a generally circular opening 58 which receives a depending part of the upper frame structure 51 to guide the upper frame structure 51 during stewing.

The main frame part 40 further includes four connecting arms 60-63 for attaching the central portion 50 to the track sub-frames 15, 16. A first pair of the connecting arms 60. 61 are provided by either end of a fabricated box section element 65, whilst a second pair of the connecting arms 62, 63 are provided by either end of another fabricated box section element 66. The connecting arms 60-63 are each attached to respective track sub-frames 15, 16 by welding to the integral cast inwardly extending projecting formations 42. Although in this example, each connecting arm 60-63 is welded between a pair of such formations 42, in another example the arms 60-63 may each be welded to a single inwardly extending formation 42, or to more than one or two formations one or more of which may extend within the fabricated box section element 65, 66. The box section elements 65, 66 are each welded to the central portion 50 as indicated at W, and extend substantially perpendicularly relative to a longitudinal axis L of the working machine 10.

It will be appreciated that particularly where the monolithic castings of the track sub-frames 15, 16 are provided in an readily weldable cast material. such as cast steel, welding of the fabricated box section elements 65, 66 to the track sub frame castings is facilitated. However the track sub frames 15, 16 may be cast in any weldable material, such as cast iron although special equipment and techniques may be required to weld the castings 15, 16 to the elements 65, 66. Moreover the central portion 50 of the main frame structure 40 preferably is cast in steel to facilitate welding the fabricated box section elements 65, 66 to the central portion 50, but again may be provided in another preferably weldable material.

During manufacture it will be appreciated that by attaching the castings of the track sub-frames 15, 16 to the main frame part 40 as described, a very strong main frame structure 11 may be provided.

Many modifications may be made without departing from the scope of the invention. For example, the track sub-frame members 24 and 25 of each track sub-frame 15, 16 need not be of the exact configurations shown and described, and more or less track supporting devices than those shown at 17, 18. 19 and 20 may be provided as are required to support the track 12. Although it is preferable for the main frame part 40 to include a cast central portion 50 and for there to be four connecting arms 60 to 63 provided by fabricated box section elements 65, 66 other main frame part 40 configurations are possible.

In FIG. 1, the machine shown to which it has been described the present invention may be applied, is conventionally known as a "mini" or "micro" excavator, because the working machine 10 is small and the working arm 54 thereof is configured to perform excavating operations. The invention may be embodied in a larger working machine which may or may not have a slewing mechanism for stewing an upper frame structure 51 relative to the main frame structure 11. Indeed the invention is applicable to any working machine having a pair of tracks 12.

The invention claimed is:

1. A working machine having a main frame structure which includes a pair of endless tracks with each track entrained about track supporting devices mounted by a track sub-frame, the sub-frame including inner and outer members interconnected by cross members with the inner and outer members arranged side by side, at least one upper track support device mounted between the inner and outer members at or adjacent upper edges thereof, at least one lower track supporting device mounted between the inner and outer members at or adjacent lower edges thereof, and wherein the inner and outer members and cross members of at least one of the track sub-frames being provided by a monolithic casting, and wherein at least one of the inner and outer track sub-frame members provides a mounting for a track tensioning mechanism for maintaining a desired tension in the track entrained about the track supporting devices the main frame structure including a main frame part which lies between the pair of track sub-frames, the main frame part including a central portion for supporting a part of a slewing mechanism, the machine including an upper frame structure which is rotatable about a generally upright axis relative to the main frame structure, by the slewing mechanism, the central portion of the main frame part being attached to the inner member of each of the track sub-frames by connecting arms, which are provided by elements fabricated in a material which is weldable to the track sub-frames and wherein the inner of the track sub-frame members of the track sub-frame monolithic casting includes for each connecting arm, one or more integral formations which extend inwardly of the machine towards the central portion, the connecting arms being welded to the integral formations.

2. A machine according to claim 1 wherein the monolithic casting is provided in a weldable casting material.

3. A machine according to claim 2 wherein the track sub-frame or frames are attached to the remainder of the main frame structure by welding.

4. A machine according to claim 1 wherein the cast inner and outer members have along their respective upper and lower edges, recesses for receiving mountings for the track supporting devices.

5. A machine according to claim 4 wherein at least some of the track supporting devices each includes a roller carried on a spindle.

6. A machine according to claim 4 wherein the upper and lower edges of the inner and outer track sub-frame members include further recesses which lighten the monolithic casting.

7. A machine according to claim 1 wherein at least one of the inner and outer track sub-frame members provides an opening for mounting a track motor which in use drive a track drive sprocket located between the inner and outer members.

8. A machine according to claim 7 wherein the opening for mounting a track motor includes an opening in the at least one track sub-frame member at or towards an end of the track sub-frame member which extends longitudinally of the machine beyond the corresponding end of the other track sub-frame member.

9. A machine according to claim 1 wherein the pair of connecting arms are welded to the inner track sub-frame members of the track sub-frames, and to the central portion of the main frame part.

10. A machine according to claim 9 wherein the central portion is cast in steel.

11. A method of making a working machine having a main frame structure which includes a pair of endless tracks, each track being entrained about track supporting devices mounted by a respective track sub-frame, the method including making at least one of the track sub-frames by providing a monolithic casting including inner and outer track sub-frame members arranged side by side with there being integral cross members interconnecting the track sub-frame members, wherein the method further includes providing at least one of the inner and outer track sub-frame members with a mounting for a track tensioning mechanism for maintaining a desired tension in the track entrained about the track supporting devices, providing the main frame structure with a main frame part which lies between the pair of track sub-frames, the main frame part including a central portion for supporting a part of a slewing mechanism, and providing the machine with an upper frame structure which Is rotatable about a generally upright axis relative to the main frame structure, by the slewing mechanism, attaching the central portion of the main frame structure to the inner member of each of the track sub-frames by connecting arms which are provided by elements fabricated in a material which is weldable to the track sub-frames, and wherein the method further includes providing the inner of the track sub-frame members of the track sub-frame monolithic casting, for each connecting arm with one or more integral formations which extend inwardly of the machine towards the central portion, the connecting arms being welded to the integral formations.

* * * * *